United States Patent

Helms et al.

(10) Patent No.: US 11,372,376 B2
(45) Date of Patent: Jun. 28, 2022

(54) METHOD FOR COOK TIME SYNCHRONIZATION

(71) Applicant: Haier US Appliance Solutions, Inc., Wilmington, DE (US)

(72) Inventors: Chad Michael Helms, Louisville, KY (US); Todd E. Greenwood, Pewee Valley, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 756 days.

(21) Appl. No.: 16/047,070

(22) Filed: Jul. 27, 2018

(65) Prior Publication Data

US 2020/0033811 A1    Jan. 30, 2020

(51) Int. Cl.
*A47J 36/32* (2006.01)
*G04F 1/00* (2006.01)
*G05B 19/042* (2006.01)

(52) U.S. Cl.
CPC ............ *G04F 1/005* (2013.01); *A47J 36/321* (2018.08); *G05B 19/042* (2013.01); *G05B 2219/25257* (2013.01); *G05B 2219/25482* (2013.01)

(58) Field of Classification Search
CPC ........ A23L 5/10; A23V 2002/00; A47J 27/10; A47J 36/321
See application file for complete search history.

(56) References Cited

U.S. PATENT DOCUMENTS

| 8,218,402 B2 | 7/2012 | Lewis et al. |
| 2004/0058706 A1* | 3/2004 | Williamson ....... H04N 21/8106 455/557 |
| 2011/0070340 A1* | 3/2011 | Pechaigner ............. F24C 7/082 426/231 |
| 2016/0073453 A1* | 3/2016 | Hyde ................... H05B 6/6447 219/745 |
| 2017/0224148 A1* | 8/2017 | Koennings ....... G05B 19/41835 |
| 2017/0224149 A1 | 8/2017 | Koennings et al. |

FOREIGN PATENT DOCUMENTS

KR    100396641 B1    8/2003

* cited by examiner

*Primary Examiner* — Anthony J Weier
(74) *Attorney, Agent, or Firm* — Dority & Manning, P.A.

(57) ABSTRACT

A method for cook time synchronization includes synchronizing a cook time in one of a plurality of cooking appliances to a user selected remaining cook time from one of the other of the plurality of cooking appliances. The method also includes: (1) transmitting, to the one of the plurality of cooking appliances, a remaining cook time from each of the other of the plurality of cooking appliances over a network; and/or (2) requesting, at the one of the plurality of cooking appliances, the remaining cook time from each of the other of the plurality of cooking appliances over the network in response to a user input at the one of the plurality of cooking appliances.

8 Claims, 1 Drawing Sheet

METHOD FOR COOK TIME SYNCHRONIZATION

FIELD OF THE INVENTION

The present subject matter relates generally to cook time synchronization in appliances.

BACKGROUND OF THE INVENTION

Houses frequently include cooking appliances, such as ovens, stoves, ranges, microwaves, etc. Cooking meals with such appliances poses certain challenges. For example, the cooking appliances heat food at different rates, and difference foods have different cooking times. Thus, cooking meals with different appliances such that foods finish at the same time can be difficult.

BRIEF DESCRIPTION OF THE INVENTION

Aspects and advantages of the invention will be set forth in part in the following description, or may be apparent from the description, or may be learned through practice of the invention.

In a first example embodiment, a method for cook time synchronization includes transmitting, to one of a plurality of cooking appliances, a remaining cook time from each of the other of the plurality of cooking appliances over a network. The method also includes synchronizing a cook time in the one of the plurality of cooking appliances to a user selected remaining cook time from one of the other of the plurality of cooking appliances.

In a second example embodiment, a method for cook time synchronization includes requesting, at one of a plurality of cooking appliances, a remaining cook time from each of the other of the plurality of cooking appliances over a network in response to a user input at the one of the plurality of cooking appliances. The method also includes synchronizing a cook time in the one of the plurality of cooking appliances to a user selected remaining cook time from one of the other of the plurality of cooking appliances.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
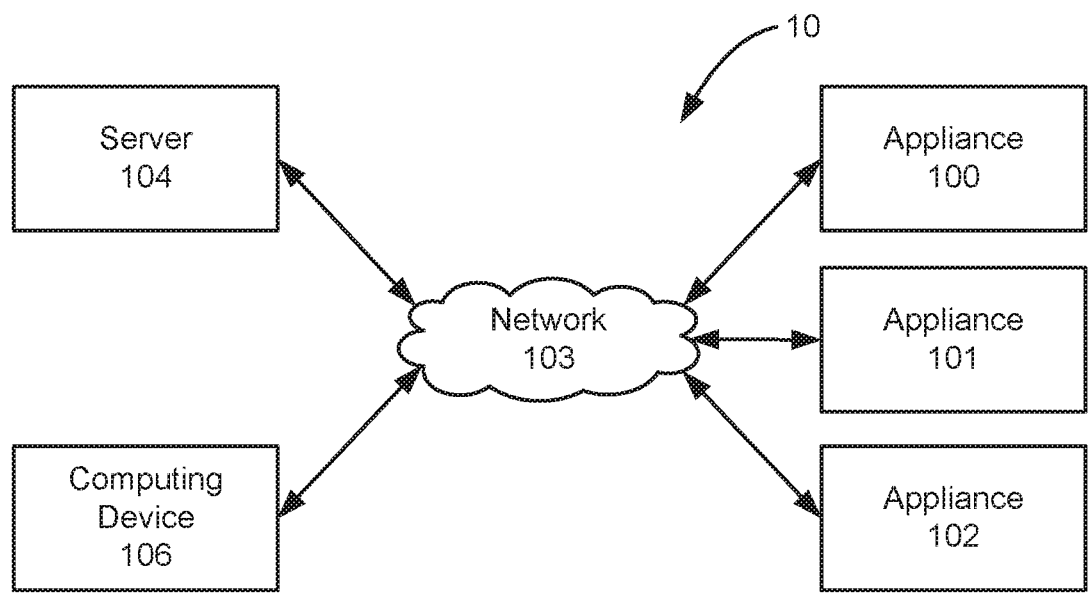
FIG. 1 is a schematic view of a system for cook time synchronization according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a schematic view of a cook time synchronization system 10 according to an example aspect of the present subject matter. Cook time synchronization system 10 includes a plurality of network connected cooking appliances. In FIG. 1, cook time synchronization system 10 includes three network connected cooking appliances: a first cooking appliance 100; a second cooking appliance 101; and a third cooking appliance 102. However, it will be understood that cook time synchronization system 10 may include any suitable number of network connected cooking appliances, e.g., two, four, five or more network connected cooking appliances, in alternative example embodiments. Each of the network connected cooking appliances in cook time synchronization system 10 may be any suitable type of network connected cooking appliance. For example, each network connected cooking appliance may be one of a stove appliance, an oven appliance, a microwave appliance, a cooktop appliance, a range appliance, etc.

Figure 2:
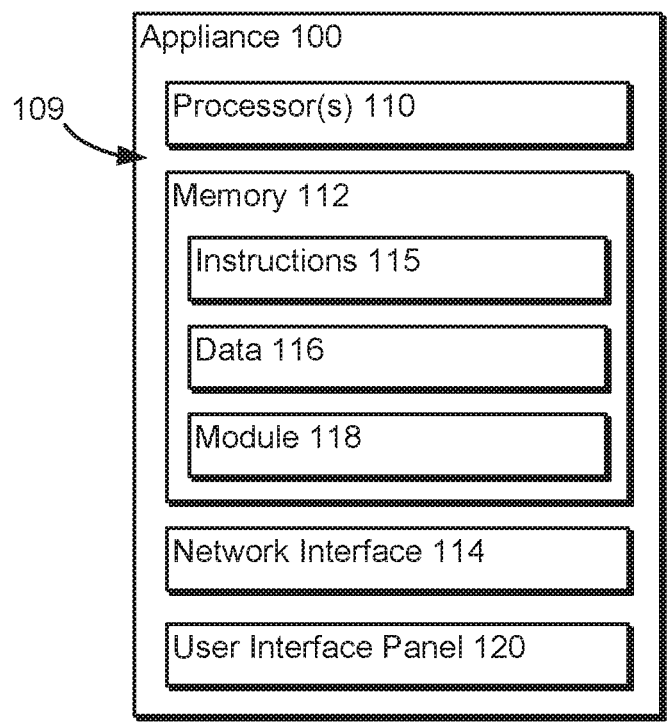
FIG. 2 is a schematic view of a cooking appliance of the example cook time synchronization system of FIG. 1.

FIG. 2 is a schematic view of cooking appliance 100 of cook time synchronization system 10. Although only cooking appliance 100 is described in greater detail below, each of the network connected cooking appliances (e.g., appliance 101 and/or appliance 102) in cook time synchronization system 10 may include some or all of the components described below for cooking appliance 100.

Appliance 100 is connectable to a network 103. Thus, e.g., appliance 100 may communicate with a server 104 via network 103. In particular, appliance 100 may transmit data, e.g., related to operation of appliance 100, from appliance 100 to server 104 or other network connected cooking appliances in cook time synchronization system 10 via network 103. As discussed in greater detail below, appliance 100 includes features for synchronizing a cook time of appliance 100 to a cook time of another of the network connected cooking appliances (e.g., appliance 101 and/or appliance 102) in cook time synchronization system 10.

Appliance 100 includes one or more processors 110, a memory 112, and a network interface 114. Network interface 114 of appliance 100 can include any suitable components for interfacing with one more networks, such as network 103. For example, network interface 114 of appliance 100 may include transmitters, receivers, ports, controllers, antennas, or other suitable components.

Network interface 114 may establish communication with network 103 via a connection through any suitable medium, e.g., wired or wireless. Network 103 may be any type of communications network, such as a local area network (e.g. intranet), wide area network (e.g. Internet), or some combination thereof. In general, communication between controller 109 and network 103 may be carried via associated network interfaces using any type of connection, using a variety of communication protocols (e.g. TCP/IP, HTTP), encodings or formats (e.g. HTML, XML), and/or protection schemes (e.g. VPN, secure HTTP, SSL). In particular, the network 103 may be a wireless local area network (WLAN) configured to conform to IEEE 802.11.

The processor(s) 110 of appliance 100 can be any suitable processing device, such as a microprocessor, microcontroller, integrated circuit, or other suitable processing device. The memory 112 of appliance 100 can include any suitable computing system or media, including, but not limited to, non-transitory computer-readable media, RAM, ROM, hard drives, flash drives, or other memory devices. The memory 112 of appliance 100 can store information accessible by processor(s) 110 of appliance 100, including instructions 115 that can be executed by processor(s) 110 to control various components of appliance 100 to provide appliance functionality and data 116. Thus, the combination of one or more processors 110 and memory 112 may correspond to a controller configured to implement various programs or methods to operate appliance 100, and processors 110 and memory 112 may be collectively referred to herein as a controller 109. Input/output ("I/O") signals may be routed between controller 109 and various operational components of appliance 100 along wiring harnesses that may be routed within appliance 100.

A module 118 is included or stored in memory 112 of appliance 100. It will be appreciated that the term "module" refers to computer logic utilized to provide desired functionality. Thus, a module can be implemented in hardware, application specific circuits, firmware and/or software controlling a general purpose processor. In one embodiment, modules are program code files stored on the storage device, loaded into memory and executed by a processor or can be provided from computer program products, for example computer executable instructions, that are stored in a tangible computer-readable storage medium such as RAM, hard disk or optical or magnetic media. Thus, while module 118 is shown stored in memory 112 of appliance 100 in the example embodiment shown in FIG. 1, module 118 may be stored in or implemented by any other suitable component of system 100 in alternative example embodiments.

Appliance 100 also includes a user interface panel 120. User interface panel 120 is located within convenient reach of a user of appliance 100. User interface panel 120 includes various input components, such as one or more of a variety of touch-type controls, electrical, mechanical or electro-mechanical input devices including knobs, rotary dials, push buttons, and touch pads. The user interface panel 120 may include a display component, such as a digital or analog display device, designed to provide operational feedback to a user.

Various appliance features of appliance 100 may be activated/deactivated by a user manipulating the input components on user interface panel 120. Thus, e.g., when appliance 100 is a cooktop or oven appliance, a user may manipulate knobs or buttons on user interface panel 120 to activate and deactivate heating elements of the appliance. As another example, a user of appliance 100 may set a timer on user interface panel 120.

As may be seen in FIG. 1, a computing device 106 is connectable to a network 103. Thus, e.g., computing device 106 may communicate with appliance 100 and/or server 104 via network 103. As an example, computing device 106 may transmit user command inputs to appliance 100 and/or server 104 via network 103. Thus, computing device 106 may include suitable input components, such as touch-type controls, electrical, mechanical or electro-mechanical input devices, etc. As another example, computing device 106 may receive video, audio and/or text data from server 104 via network 103 and display such data to a user of computing device 106. Thus, computing device 106 may include a suitable display, such as a digital or analog display. As may be seen from the above, computing device 106 is network connected and includes user inputs and a display. Thus, e.g., computing device 106 may be a smartphone, tablet, network connected television, etc. that allows display of data from network 103 and transmission of user inputs over network 103.

An example method for cook time synchronization of appliance 100 will now be described. The method may synchronize a cook time of appliance 100 to a cook time of another of the network connected cooking appliances (e.g., appliance 101 and/or appliance 102) in cook time synchronization system 10. It will be understood that while discussed below in a certain sequence, the method may be performed in other suitable sequences in alternative example embodiments. Thus, the method is not limited to the particular sequence described below.

Initially, the network connected cooking appliances of cook time synchronization system 10 may be connected to network 103. Thus, the network connected cooking appliances (e.g., first, second and third appliances 100, 101, 102) may communicate with one another via network 103. Server 104 and computing device 106 may also be connected to network 103. Thus, the network connected cooking appliances may communicate with server 104 and computing device 106 via network 103.

With the network connected cooking appliances connected via network 103, a remaining cook time may be communicated between the network connected cooking appliances. In particular, at one of the network connected cooking appliances, a remaining cook time for each of the other network connected cooking appliances may be requested in response to a user input at the one of the network connected cooking appliances. For example, a user of first appliance 100 may utilize user interface panel 120 to activate a "Cook Sync" feature on first appliance 100 such that first appliance 100 requests the remaining cook time from each of second and third appliances 101, 102. More particularly, first appliance 100 may increment a synchronization number and send a cook time request to server 104, and server 104 may relay the cook time request to second and third appliances 101, 102. Alternatively, the user may utilize computing device 106 to request the remaining cook time from each of second and third appliances 101, 102.

The network connected cooking appliances in cook time synchronization system 10 may receive the request for the remaining cook time, and the network connected cooking appliances may each transmit a respective remaining cook time in response to the request. For example, the remaining cook times from second and third appliances 101, 102 may be transmitted to first appliance 100, e.g., via server 104. In particular, second and third appliances 101, 102 may receive the cook time request from first appliance 100 via server 104. In response to the cook time request, second and third appliances 101, 102 may collect all active timers on the second and third appliances 101, 102 and may each transmit a respective cook time response message back to server 104. The cook time response message may include the same synchronization number as the cook time request from first appliance 100 as well as a list of all active timers on second appliance 101 and/or third appliance 102. Server 104 may then transit the cook time response messages to all network connected cooking appliances in cook time synchronization system 10. First appliance 100 may wait for a period of time, e.g., ten seconds, to ensure that first appliance 100 receives all cook time response messages.

At the one of the network connected cooking appliances, the remaining cook times from the other network connected cooking appliances may be presented on a display for a user of the one of the network connected cooking appliances to view. For example, the remaining cook times from second and third appliances 101, 102 may be presented on the display of user interface panel 120 on first appliance 100. In particular, when first appliance 100 receives the cook time response messages, first appliance 100 may compare the synchronization number from the cook time request to the synchronization number in the cook time response messages. If the synchronization numbers match, then first appliance 100 may add the active timers from the cook time response messages to a list of active timers in the first appliance 100. Conversely, first appliance 100 may discard the cook time response messages if the synchronization numbers do not match. First appliance 100 may then present the list of active timers on the display of user interface panel 120 on first appliance 100. Alternatively, the list of active timers may be presented to the display of computing device 106.

A cook time in the one of the network connected cooking appliances may then be synchronized to a user selected one of the remaining cook times from the other network connected cooking appliances. For example, the cook time of first appliance 100 may be synchronized to the user selected one of the remaining cook times for second appliance 101 or third appliance 102. Thus, a termination of the cook time in first appliance 100 may be matched to a termination of the remaining cook time in the user selected one of second appliance 101 or third appliance 102. In particular, the user of first appliance 100 may select an available timer from list of active timers collected from the cook time response messages (e.g., on computing device 106 or on user interface panel 120 of first appliance 100), and first appliance 100 may update a delay time such that first appliance completes a cook cycle at the same time as the user selected timer.

It will be understood that the above described method for cook time synchronization is provided by way of example only. In alternative example embodiments, the server 104 may accumulate the cook time response messages and send to the cook time response messages to first appliance 100. In addition, the network connected appliances may communicate directly with one another rather than going through server 104. First appliance 100 may also send messages directly to the other network connected appliances in place of using a synchronization number.

As may be seen from the above, cook time synchronization system 10 allows network connected appliances to communicate remaining cook times between one another within a user's home. In addition, cook time synchronization system 10 may not require special logic/software in the connected infrastructure to allow data communication between the network connected appliances. Further, cook time synchronization system 10 may communicate remaining cook times on demand to avoid unnecessary data transmission between the network connected appliances and/or to keep the remaining cook times updated and accurate.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for cook time synchronization, comprising:
   in response to a user input at one of a plurality of cooking appliances, sending a cook time request with a synchronization number to each of the other of the plurality of cooking appliances over a network;
   transmitting, to the one of a plurality of cooking appliances, the remaining cook time and the synchronization number from each of the other of the plurality of cooking appliances over the network;
   presenting the remaining cook time from each of the other of the plurality of cooking appliances on a display of the one of the plurality of cooking appliances; and
   synchronizing a cook time in the one of the plurality of cooking appliances to a user selected remaining cook time from one of the other of the plurality of cooking appliances.

2. The method of claim 1, wherein each of the plurality of cooking appliances is an oven appliance, a cooktop appliance, a range appliance or a microwave appliance.

3. The method of claim 1, wherein a termination of the cook time in the one or more of the other of the plurality of cooking appliances is matched to a termination of the user selected remaining cook time from the one of the plurality of cooking appliances when the cook time in the one or more of the other of the plurality of cooking appliances synchronizes to the user selected remaining cook time.

4. A method for cook time synchronization, comprising:
   requesting, at one of a plurality of cooking appliances, a remaining cook time from each of the other of the plurality of cooking appliances over a network in response to a user input at the one of the plurality of cooking appliances by sending a cook time request with a synchronization number to each of the other of the plurality of cooking appliances over the network;
   presenting the remaining cook time from each of the other of the plurality of cooking appliances on a display of the one of the plurality of cooking appliances when the remaining cook time and the synchronization number are both transmitted from each of the other of the plurality of cooking appliances to the one of the plurality of cooking appliances; and
   synchronizing a cook time in the one of the plurality of cooking appliances to a user selected remaining cook time from one of the other of the plurality of cooking appliances.

5. The method of claim 4, wherein each of the plurality of cooking appliances is an oven appliance, a cooktop appliance, a range appliance or a microwave appliance.

6. The method of claim 4, further comprising transmitting the remaining cook time from each of the other of the plurality of cooking appliances over the network to the one of a plurality of cooking appliances.

7. The method of claim 6, wherein transmitting the remaining cook time from each of the other of the plurality of cooking appliances over the network comprises sending a cook time response message with the synchronization number from each of the other of the plurality of cooking appliances.

8. The method of claim 4, wherein a termination of the cook time in the one or more of the other of the plurality of cooking appliances is matched to a termination of the user selected remaining cook time from the one of the plurality of cooking appliances when the cook time in the one or more of the other of the plurality of cooking appliances synchronizes to the user selected remaining cook time.

\* \* \* \* \*